March 24, 1970 H. AULHORN ET AL 3,502,906

FREQUENCY ERROR CORRECTING CIRCUIT

Filed Jan. 31, 1968 2 Sheets-Sheet 1

INVENTORS

H. Aulhorn - F. T. Knabe

BY [signature] ATTORNEY

INVENTORS

H. Aulhorn-F.T. Knabe

BY [signature] ATTORNEY

United States Patent Office 3,502,906
Patented Mar. 24, 1970

3,502,906
FREQUENCY ERROR CORRECTING CIRCUIT
Herbert Aulhorn and Frank Torsten Knabe, Leonberg, Germany, assignors to International Standard Electric Corporation, New York, N.Y., a corporation of Delaware
Filed Jan. 31, 1968, Ser. No. 702,043
Claims priority, application Germany, Feb. 17, 1967, St 26,509
Int. Cl. H03k 5/08
U.S. Cl. 307—237 5 Claims

ABSTRACT OF THE DISCLOSURE

The invention provides a compensation for the pulse distortions which are due to frequency shifts in FM digital signal transmission systems. With the aid of two adjusting quantities, the demodulated signal is forced into a predetermined voltage range. In the case of a dynamic control, the regulation forces signals to uniformly exceed the two limiting values of a slicer. In the case of a static control, the signal is forced to reach of one of the two limiting values.

This invention relates to a receiving end circuit arrangement for correcting the channel-inherent pulse distortion of frequency-modulated digital signals which result from carrier frequency displacements due to noise or interferences.

In this circuit, the received and demodulated signals are voltage pulses having characteristic maximum and minimum values. These pulses are fed to a threshold relay which converts them into rectangular pulses with two characteristic levels. Moreover, there are two voltage thresholds corresponding to maximum or minimum values of the non-distorted signal. If the pulses exceed or fall short of these values, correcting voltages are formed with the aid of a signal displacement in a direction of the non-distorted signal; or, there is a corresponding displacement of the voltage required to operate the threshold relay.

These types of circuits are used in transmission—especially in those applications where a frequency shift appears during the transmission of frequency-modulated digital signals, as might happen, for example, during carrier-frequency transmissions.

This distortion causes a DC voltage which is in proportion to the frequency error. The voltage is then superimposed upon the intelligence signal. Upon demodulation at the usual discriminators, with this DC voltage added, there is a falsification of the pulse duration at the output of the receiving threshold circuit (telegraph relay).

Accordingly, an object of the invention is to provide a frequency error correction either to compensate for pulse distortion or to reduce it to an agreeable extent.

This object may be accomplished in two different ways: correction with the aid of a pilot tone or, as in the case of the present invention, a channel-inherent correction.

The above mentioned and other features and objects of this invention and the manner of obtaining them will become more apparent, and the invention itself will be best understood by reference to the following description of an embodiment of the invention taken in conjunction with the accompanying drawings, in which:

FIG . 1 shows a voltage wave form for sending digital information of the described type;

A plurality of channel-inherent frequency error correcting circuits are already known from the relevant literature. The principle of almost all of these known circuit arrangements will now be briefly explained with reference to FIGS. 1 and 2.

Figures 1A, 1B:
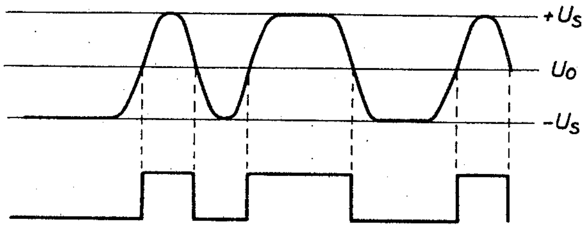
Figures 2A, 2B:
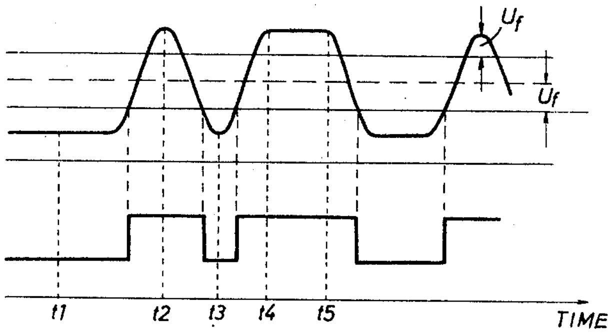
FIG. 2 shows voltage wave forms which explain the distortion involved.
Figures 2C, 2D:
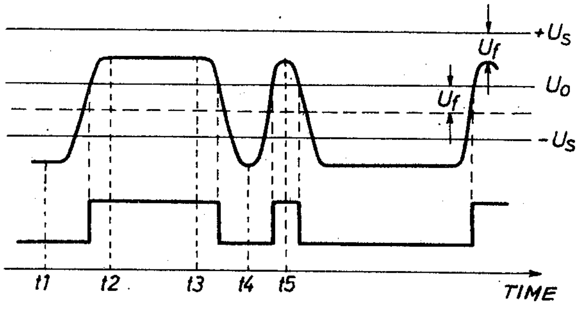

In a hypothetically faultless operating circuit, the discriminator transmits a signal having peak values $\pm U_s$ which are symmetrically positioned around a reference voltage (signal) $U_o$ (FIG. 1*a*). If the operating threshold of the subsequently arranged receiving relay is at the voltage $U_o$, there is a non-distorted rectangular pulse as shown in FIG. 1*b*. This threshold-device may be in the form of a Schmitt-trigger or an electro-mechanical telegraph relay, hereinafter referred to as "threshold relay." If there is a frequency error, the demodulated signal is shifted. In the example of FIGS. 2*a*, and 2*c*, the shift is by the amount $\pm U_f$. Thus, the resulting rectangular pulses are distorted (FIGS. 2*b, d*).

In the conventional types of channel-inherent frequency error correcting circuits, this distortion is compensated by clamping the signal between two thresholds (lying at $U_o+U_S$ and at $U_o-U_S$). Upon the detection of a signal exceeding one of these thresholds, a correcting voltage is shifted downwardly; or, the operating threshold of the threshold relay is shifted upwardly (in the case of a distortion of the type shown in FIG. 2*a*).

This well-known method is often used. However, it fails whenever the connection remains in the shifted condition corresponding to the position $-U_s$ or $+U_s$ (FIG. 2) for a long period of time during which no correcting voltage or signal is generated. At the first change-over following after the interval (i.e. to $+U_s$ or $-U_s$) the correcting voltage $U_k$, which is derived from the positive or negative peak value respectively, is generated only at a time position in which the relay has already changed over. Thus, the first rectangular pulse following after the aforementioned transmission interval, is necessarily reproduced in a distorted fashion.

Means are provided during the transmission intervals for forcing the two thresholds to be exceeded or reached respectively at all times. The respective one of the two thresholds is determined by the position of the threshold relay. To avoid pulse distortions which are likely to occur in cases where the signal coming from the frequency discriminator remains at the characteristic maximum or minimum value (transmission intervals) for a longer period of time, a dynamic two-point control occurs in which, depending on the position of the threshold relay, there is effected a continuous DC voltage shifting of the intelligence signal. Therefore, control is depending on the polarity of the intelligence signal coming from the discriminator (FIGS. 1*a*, 2*a*, 2*c*) The action of timing circuits, in either one or the other direction, acts upon reaching one of the two voltage thresholds corresponding to either the maximum or the minimum value of the non-distorted signal. This shifting is terminated by the intelligence signal.

Figure 3:
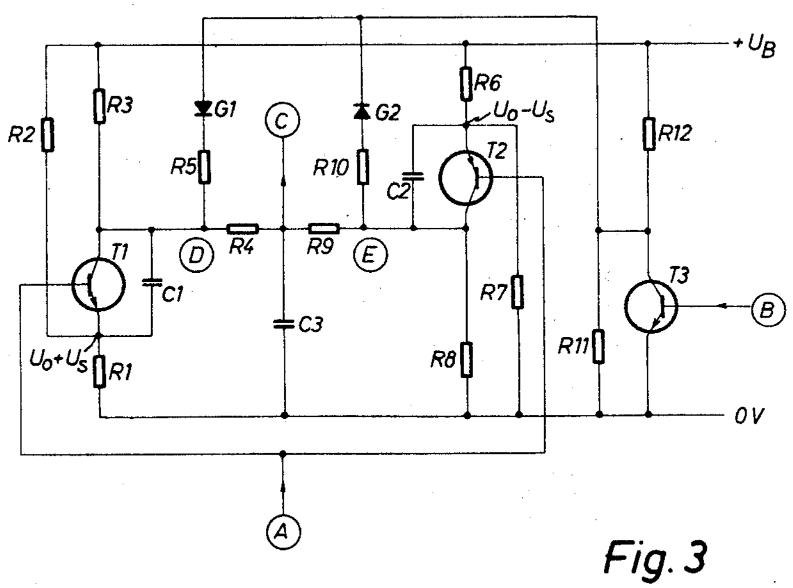
FIG. 3 shows a circuit for correcting the distortion.

In the symmetrically built-up circuit (FIG. 3), the intelligence signal from the discriminator is fed in at point A, which is connected to the base electrodes of two transistors T1 and T2 of complementary conductivity types. The base of transistor T3 is connected to the threshold relay via point B and an inverter stage (not shown). This way, the circuit is controlled so that the transistor operates as a switch. Point C is biased at the potential of the corrected reference voltage signal $U_o \pm U_k$, and is connected to the discriminator and is determinative of the DC voltage level of the intelligence signal which is the voltage at point A.

With the aid of the voltage-dividing resistors R1, R2, the emitter of transistor T1 is retained at the voltage value $U_o+U_s$. With the aid of the voltage divider R6, R7, the emitter of transistor T2 is retained at the voltage value $U_o-U_s$. At the time position *t*1 of FIG. 2, a voltage is applied to the point A, which retains the two transistors T1 and T2 in the blocked condition. If the circuit including the two rectifiers (gate circuits) G1 and G2 were not provided, the voltage at point C would be $U_0 = \frac{1}{2} U_B$ because of the voltage division across the resistors R3, R4, R9 and R8. Accordingly, no correction would take place in this case. According to FIG. 2*b*, the point B is shifted via the inverter stage (not shown) to a low output voltage responsive to an operation of the threshold relay at the time position *t*1. The transistor T3 is rendered conductive, and the gates G1 and G2 are biased to zero volt, so that the gate G1 is blocked. Whereas gate G2 is rendered conductive, and it attempts to discharge the capacitor C3 via transistor T3, gate G2, resistor R10, and resistor R9. On account of this, point C becomes more negative than $\frac{1}{2} U_B$. Point A becomes more negative by the same amount, until the transistor T2 is rendered conductive. However, in this way, point E and—by neglecting the low-emitter base voltage of transistor T2—also point A is retained at the "rated voltage" $U_0 - U_s$, thus preventing capacitor C3 from benig further discharged. The voltage at point A is the minimum value of the intelligence signal from the discriminator.

At the time position *t*2, the transistor T3 is blocked. The gates G1 and G2 are biased to the voltage $+U_B$ via the resistor R12, whereby the gate G2 is blocked and the gate G1 is rendered conductive. This gating attempts to charge the capacitor C3 positively via the resistors R5 and R4. However, since point A is positive, the transistor T1 is rendered conductive, and this retains point D at the voltage $U_0 + U_s$. Also the base of transistor T1 is detained at the upper rated voltage value $U_0 + U_s$ and hence at the maximum value of the intelligence signal A.

However, in cases where the upper threshold (FIG. 2*a*) is exceeded, the capacitor C3 discharges across resistor R4, transistor T1 (conductive) and resistor R1. This discharge occurs because transmission is started at the time position *t*2. Or, else capacitor C3 did not have sufficient time for discharge during the preceding phase.

Point D reassumes the voltage value $U_0 + U_s$ in any event. Shortly after the time position *t*2, transistor T1 is again changed into the blocked condition, but transistor T3 remains blocked until the threshold relay changes. Thus, the potential of point D is retained by the charge on capacitor C1 until transistor T2 takes over the control of the voltage at the point E at the time position *t*3.

In case of an inverted frequency shift with respect to FIG. 2*a* (i.e. in the case shown in FIG. 2*c*), the intelligence signal is shifted downwardly. Owing to the resulting error DC voltage, all of the three transistors T1, T2, T3 are blocked during the time position *t*2, because the voltages are now $U_0 + U_s > A > U_0 - U_s$, and because the inverted signal of FIG. 2*d* is negative. Accordingly, gate G2 is blocked, whereas gate G1 is conductive. This charges the capacitor C3 via the resistors R5 and R4. The charging of the capacitor is terminated as soon as point C and, consequently, also point A reach the voltage value $U_0 + U_s$. In other words, this is as soon as the transistor T1 is rendered conductive.

While the principles of the invention have been described above in connection with specific apparatus and applications, it is to be understood that this description is made only by way of example and not as a limitation on the scope of the invention.

What is claimed is:

1. A circuit for correcting the pulse distortion of frequency-modulated digital signals, the received demodulated signals being in the form of voltages with characteristic maximum and minimum values, comprising means for feeding said signals to a threshold relay for converting these signals into rectangular pulses with two characteristic levels, means for providing two voltage threshold corresponding to the maximum or minimum value of the non-distorted signal means responsive to a detection of said voltages outside of said values for applying correcting voltages to effect a signal displacement or shift in the direction of the voltage level of a non-distorted signal, a frequency discriminating means for precluding pulse distortions which are likely to occur after the signal as arriving from the frequency discriminator has remained for a longer period of time at the characteristic maximum or minimum value transmission intervals, said last named means comprising a dynamic two-point control means operative responsive to the operated position of the threshold relay, depending on the polarity of the intelligence signal from the discriminator means including timing circuits for applying a continuous DC voltage displacement or shift of the intelligence signal in either of two directions, and means responsive to said displacement reaching one of the two voltage thresholds corresponding to either the maximum or the minimum value of the non-distorted signal for terminating this shifting of the intelligence signal.

2. A circuit according to claim 1, wherein said two voltage thresholds are provided responsive to the output of two transistors of complementary conductivity type, the emitter electrodes of which being connected to a potential point on each of two voltage dividing resistor networks connected between zero potential and a positive voltage point, the collector electrodes of which being coupled, via two load resistors to either zero potential or positive voltage depending on the conductivity type of the transistors, and to the base electrodes of which there is commonly fed an intelligence signal received from the discriminator which is controlled with respect to its DC voltage level.

3. A circuit according to claim 1 wherein said timing circuits are controlled with the aid of two gating circuits with oppositely poled forward directions, and means for making one of said gate circuits conductive responsive to the operated position of the threshold relay whereby operation of said relay is depending on the voltage level as supplied at the output of the discriminator.

4. A circuit according to claim 3, characterized in this that said timing circuit comprises a capacitor coupled via two parallel current paths or branches each of which is in series with two resistors and one of said gating circuits, means for connecting said last named circuit of a further transistor as well as to a potential point on a further voltage dividing resistor which is connected between the zero potential and the positive voltage source, said transistor being controlled at its base electrode by the action of the output signal of the threshold relay so that its collector electrode is either lying practically at zero potential or at a positive potential as determined by the voltage divider ratio.

5. A circuit according to claim 2, characterized in this that the emitter-collector sections of said two transistors are bridged with the aid of capacitors which, subsequently to the blocking of the respective transistor, retain the potential at the respective collector electrode until said other transistor has been rendered conductive, and it takes over the control.

References Cited

UNITED STATES PATENTS

| | | | |
|---|---|---|---|
| 3,151,299 | 9/1964 | Smith ___________ | 328—162 X |
| 3,327,230 | 6/1967 | Konian ____________ | 328—164 |
| 3,353,106 | 11/1967 | Dudek et al. _____ | 307—237 X |
| 3,398,381 | 8/1968 | Torick et al. _____ | 307—237 X |
| 3,428,827 | 2/1969 | Berry _____________ | 307—235 |

JOHN S. HEYMAN, Primary Examiner

U.S. Cl. X.R.

307—233, 235; 328—115, 155, 164, 169